(12) United States Patent
Siga et al.

(10) Patent No.: US 7,546,017 B2
(45) Date of Patent: Jun. 9, 2009

(54) ELECTRO-PHOTONIC MODULATORS

(75) Inventors: Mihail Siga, Mountain View, CA (US); Shih-Yuan Wang, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/904,887

(22) Filed: Sep. 28, 2007

(65) Prior Publication Data

US 2009/0087132 A1  Apr. 2, 2009

(51) Int. Cl.
*G02B 6/10* (2006.01)
*G02F 1/035* (2006.01)
*G02B 6/12* (2006.01)
*G02B 6/26* (2006.01)
*G02B 6/34* (2006.01)
*G02B 6/00* (2006.01)

(52) U.S. Cl. .............................. 385/131; 385/1; 385/2; 385/3; 385/14; 385/31; 385/37; 385/39; 385/40; 385/129; 385/130; 385/132; 385/141

(58) Field of Classification Search ................. 385/1, 385/2, 3, 14, 31, 37, 39, 40, 129, 130, 131, 385/132, 141
See application file for complete search history.

(56) References Cited

U.S. PATENT DOCUMENTS

| | | | |
|---|---|---|---|
| 7,289,221 B2 * | 10/2007 | Wang et al. | 356/477 |
| 2004/0135155 A1 * | 7/2004 | Otsuka et al. | 257/79 |
| 2005/0100296 A1 * | 5/2005 | Zoorob | 385/129 |
| 2008/0070334 A1 * | 3/2008 | Krames et al. | 438/32 |

* cited by examiner

*Primary Examiner*—Brian M. Healy
*Assistant Examiner*—Hung Lam (57) ABSTRACT

Various embodiments of the present invention are directed to modulators that can be operated electronically and used to modulate electromagnetic radiation. In one embodiment of the present invention, a modulator comprises a slot waveguide having a top semiconductor layer, a bottom semiconductor layer, and a transmission layer sandwiched between the top semiconductor layer and the bottom semiconductor layer. The slot waveguide also includes a plurality of holes forming a Bragg grating along the length of the slot waveguide.

18 Claims, 9 Drawing Sheets

ELECTRO-PHOTONIC MODULATORS

TECHNICAL FIELD

Embodiments of the present invention are directed to modulators, and, in particular, to electronically operated modulators that can be employed to encode information in electromagnetic information.

BACKGROUND

In recent years, the increasing density of microelectronic devices on integrated circuits has lead to a technological bottleneck in the density of metallic signal lines that can be used to interconnect these devices. In addition, the use of metallic signal lines yields a significant increase in power consumption and difficulties with synchronizing the longest links positioned on top of most circuits. Rather than transmitting information as electrical signals via signal lines, the same information can be encoded in electromagnetic radiation ("ER") and transmitted via waveguides, such as optical fibers, ridge waveguides, and photonic crystal waveguides. Transmitting information encoded in ER via waveguides has a number of advantages over transmitting electrical signals via signal lines. First, degradation or loss is much less for ER transmitted via waveguides than for electrical signals transmitted via signal lines. Second, waveguides can be fabricated to support a much higher bandwidth than signal lines. For example, a single Cu or Al wire can only transmit a single electrical signal, while a single optical fiber can be configured to transmit about 100 or more differently encoded ER.

Recently, advances in materials science and semiconductor fabrication techniques have made it possible to develop photonic devices that can be integrated with electronic devices, such as complementary metal oxide semiconductor ("CMOS") devices, to form photonic integrated circuits ("PICs"). The term "photonic" refers to devices that can operate with either classically characterized ER or quantized ER with frequencies that span the electromagnetic spectrum. PICs are the photonic equivalent of electronic integrated circuits and may be implemented on a wafer of semiconductor material. In order to effectively implement PICs, passive and active photonic components are needed. Waveguides and attenuators are examples of passive photonic components that can typically be fabricated using conventional epitaxial and lithographic methods and may be used to direct the propagation of ER between microelectronic devices. Physicists and engineers have recognized a need for active photonic components that can be used in PICs.

SUMMARY

Various embodiments of the present invention are directed to modulators that can be operated electronically and used to modulate electromagnetic radiation. In one embodiment of the present invention, a modulator comprises a slot waveguide having a top semiconductor layer, a bottom semiconductor layer, and a transmission layer sandwiched between the top semiconductor layer and the bottom semiconductor layer. The slot waveguide also includes a plurality of holes forming a Bragg grating along the length of the slot waveguide.

DETAILED DESCRIPTION

Various embodiments of the present invention are directed to modulators that can be operated electronically, used to encode information in ER, and implemented with CMOS circuitry. In the various device embodiments described below, a number of structurally similar components comprising the same materials have been provided with the same reference numerals and, in the interest of brevity, an explanation of their structure and function is not repeated.

Figure 1:
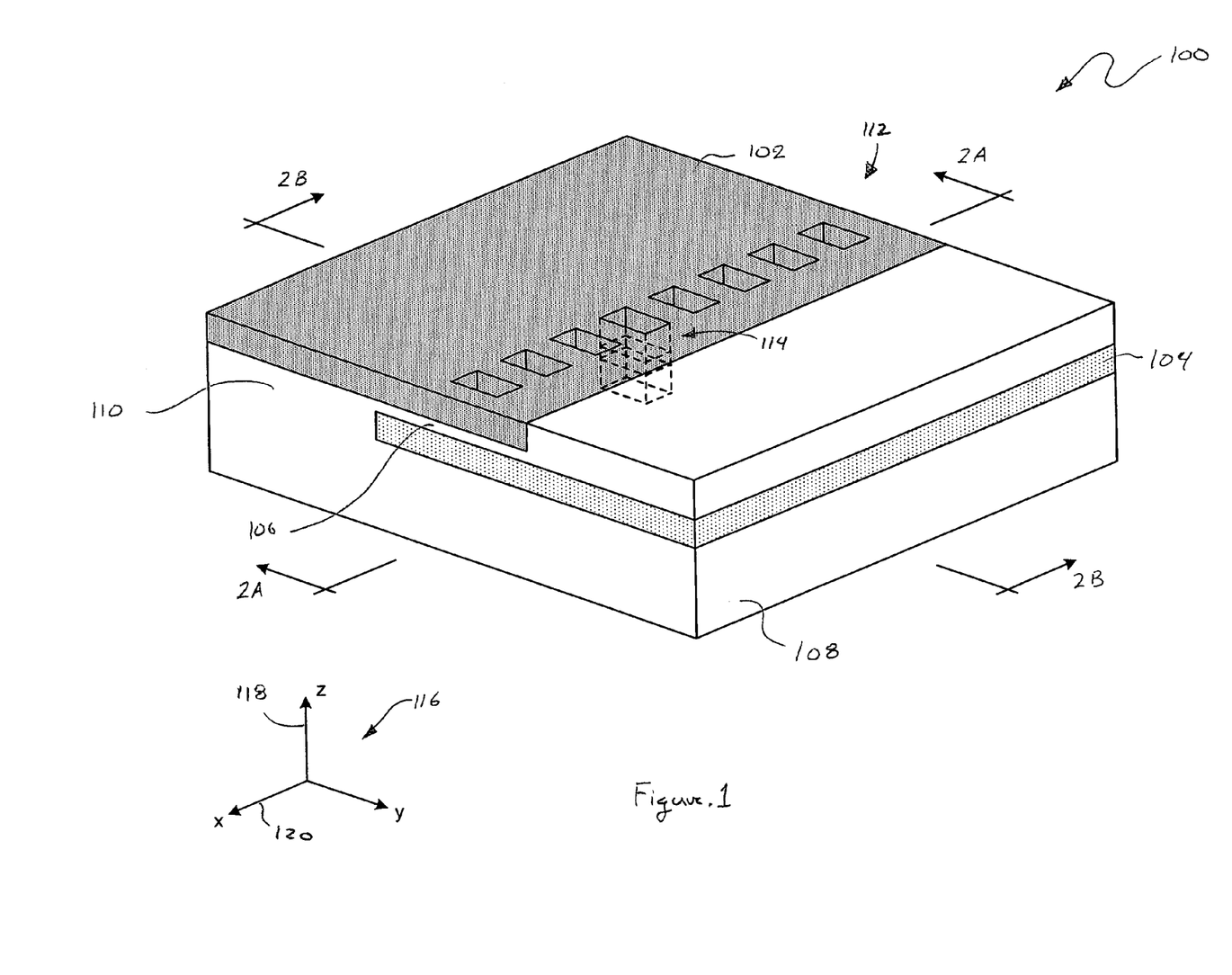
FIG. 1 shows an isometric view of a first modulator in accordance with embodiments of the present invention.

FIG. 1 shows an isometric view of a first modulator 100 in accordance with embodiments of the present invention. The modulator 100 comprises a top semiconductor layer 102, a bottom semiconductor layer 104, and a transmission layer 106 located between portions of the top semiconductor layer 102 and the bottom semiconductor layer 104. The top semiconductor layer 102 is positioned so that at least a portion of the top semiconductor layer 102 overlaps at least a portion of the bottom semiconductor layer 104. The modulator 100 also includes a substrate 108 that is configured to enclose top and bottom surfaces the bottom semiconductor layer 104 and includes a raised region 110 that supports a portion of the top semiconductor layer 102. As shown in FIG. 1, the transmission layer 106 is a continuous extension of the raised region 110 of the substrate 108. The overlapping portions of the top semiconductor layer 102, the bottom semiconductor layer 104, and the relatively thinner transmission layer 106 form a slot waveguide 112 that includes a plurality of approximately regularly spaced holes aligned in a row along the length of the stop waveguide 112 to form a Bragg grating (also referred to in the art as a "one-dimensional photonic crystal"), each hole extending through all three of the layers 102, 104, and 106 to the substrate 108. For example, a hole 114 represents one hole of the Bragg grating in the slot waveguide 112 that extends through layers 102, 104, and 106 to the substrate 108. FIG. 1 also includes a Cartesian coordinate system 116 oriented so that z-axis 118 is substantially orthogonal to the layers 102, 104, and 106 of the modulator 100, and x-axis 120 is substantially parallel to the holes. ER is transmitted along the slot waveguide 112 in the x-direction.

Figure 2A:
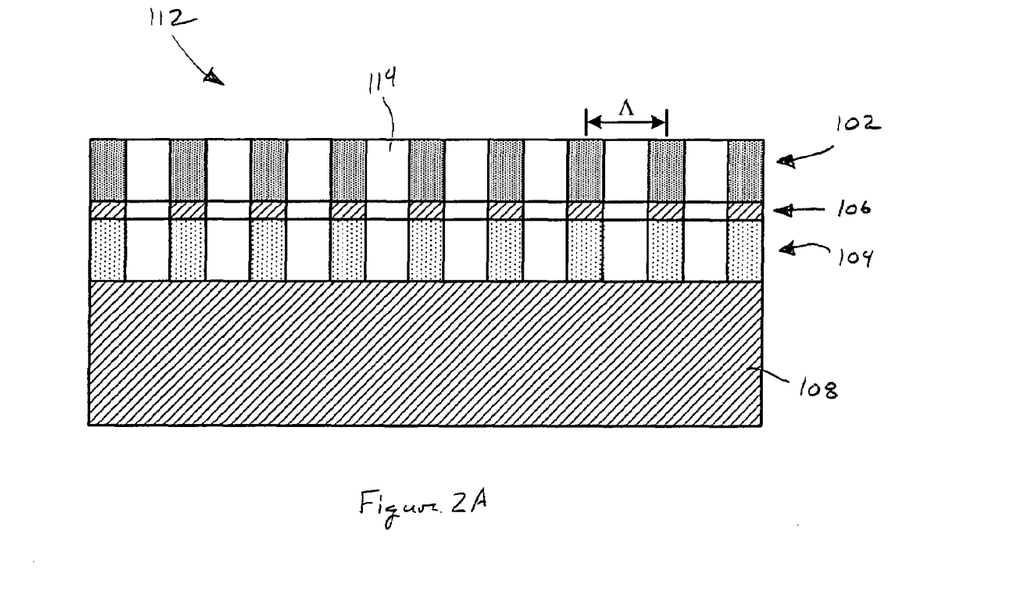
FIG. 2A shows a first cross-sectional view of the first modulator along a line 2A-2A, shown in FIG. 1, in accordance with embodiments of the present invention.
Figure 2B:
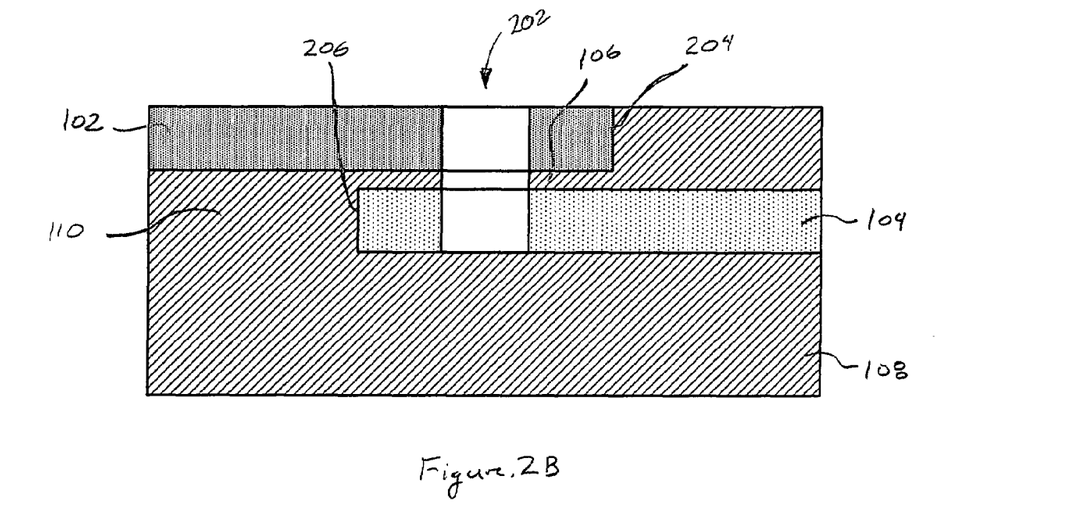
FIG. 2B shows a second cross-sectional view of the first modulator along a line 2B-2B, shown in FIG. 1, in accordance with embodiments of the present invention.

FIG. 2A shows a first cross-sectional view of the modulator 100 along a line 2A-2A, shown in FIG. 1, in accordance with embodiments of the present invention. As shown in FIG. 2A, the holes forming the Bragg grating extend through layers 102, 104, and 106 to the substrate 108 and are approximately evenly spaced with a lattice period represented by A. FIG. 2B shows a second cross-sectional view of the modulator 100 along a line 2B-2B, shown in FIG. 1, in accordance with embodiments of the present invention. As shown in FIG. 2B, a portion of the top semiconductor layer 102 overlaps a portion of the bottom semiconductor layer 104 and is partially supported by the raised region 110 of substrate 108. The transmission layer 106 is a continuous extension of the raised region 110 and is sandwiched between overlapping portions of the top semiconductor layer 102 and the bottom semiconductor layer 104. FIG. 2B also reveals that the transmission layer 106 is thinner than the top and bottom semiconductor layers 102 and 104 and that a portion of a hole 202 in the top semiconductor layer 102 is located in close proximity to a side surface 204 of the top semiconductor layer 102, and a portion of the same hole 202 that extends into the bottom semiconductor layer 104 is located in close proximity to a side surface 206 of the bottom semiconductor layer 104.

Figure 3:
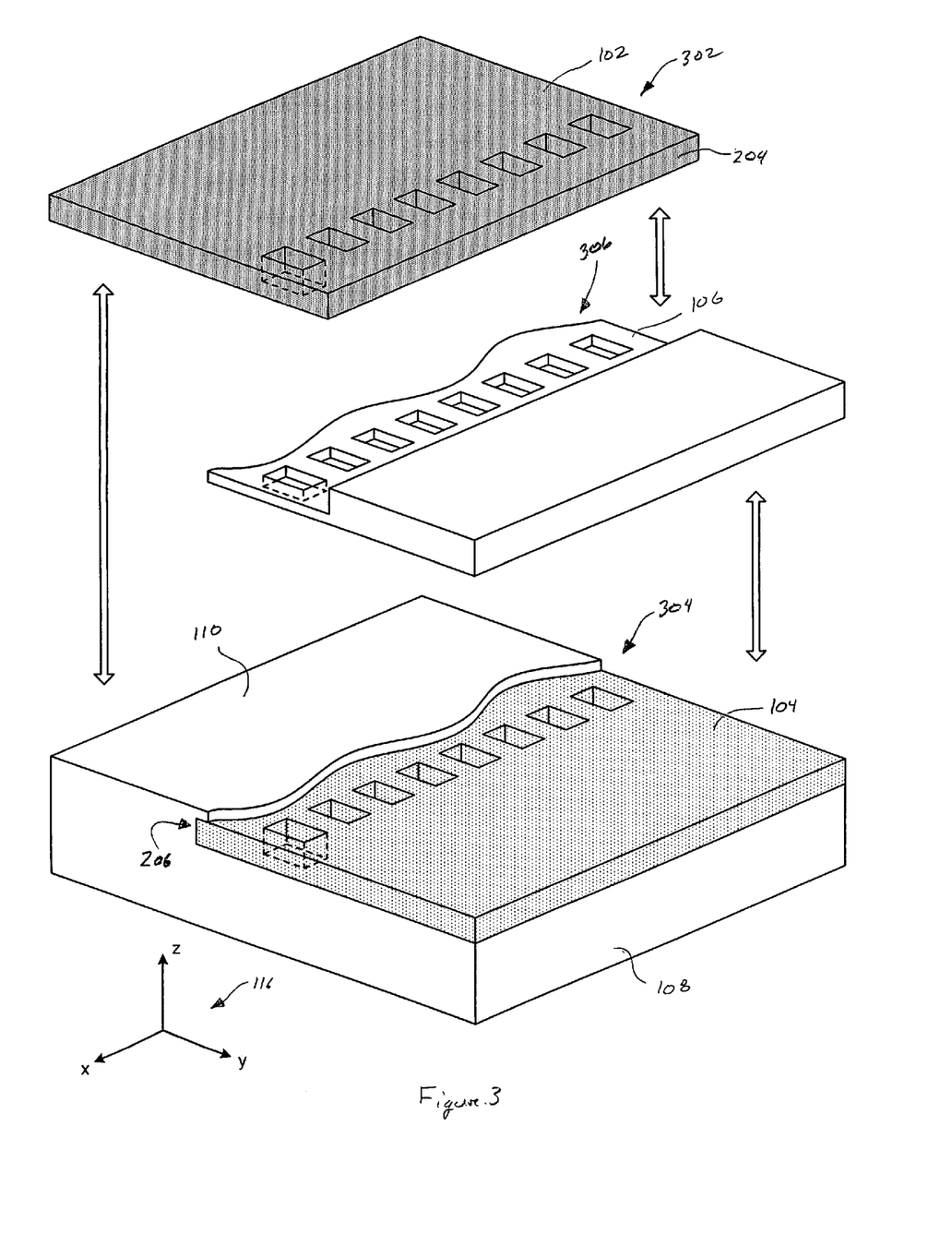
FIG. 3 shows an exploded isometric view of the first modulator in accordance with embodiments of the present invention.

FIG. 3 shows an exploded isometric view of the modulator 100 in accordance with embodiments of the present invention. In FIG. 3, the separated layers 102, 104, and 106 reveal separate rows of holes 302, 304, and 306 in the layers 102, 104, and 106 that form the Bragg grating in the slot waveguide 112 described with reference to FIGS. 1-2. As shown in the exploded isometric view of FIG. 3, the holes 302 in the top semiconductor layer 102 are located in close proximity to the side surface 204 of the top semiconductor layer 102, and the holes 304 in the bottom semiconductor layer 104 are located in close proximity to the side surface 206 of the bottom semiconductor layer 104. FIG. 3 also reveals a top surface of the raised region 110 that supports a portion of the top semiconductor layer 102

The top and bottom semiconductor layers 102 and 104 can be composed of a type IV semiconductor, a type III-V semiconductor, or a type II-VI semiconductor, where the Roman numerals II, III, IV, and V represent elements in the second, third, fifth and sixth columns of the Periodic Table of Elements. For example, the top and bottom semiconductor layers 102 and 104 can be composed of Si or Ge, which are type IV semiconductors, or be composed of a type III-V semiconductor GaAs, which comprises equal quantities of Ga, a column III element, and As, a column V element. The II-VI and the III-V semiconductors are not limited to just one column II element and one column VI element or one column III element and one column V element. The top and bottom semiconductor layers 102 and 104 may be composed of different combinations of elements selected from the elements of columns III and V and columns II and VI. For example, the top and bottom semiconductor layers 102 and 104 can be composed of $In_xGa_{1-x}As_yP_{1-y}$, where x and y range between 0 and 1. The parameters x and y are chosen in order to lattice match adjacent layers and are well-known in the art. The transmission layer 106 can be composed of $SiO_2$, $Al_2O_3$, $Si_3N_4$, a semiconductor, semiconductor alloys such as AlGaAs, a porous semiconductor that effectively reduces the effective refractive index, a dielectric polymer, or any other dielectric material that is suitable for transmitting electromagnetic radiation and has a relatively lower refractive index than, and substantially lattice matches or can be wafer bonded to the top and bottom semiconductor layers 102 and 104. For example, when $SiO_2$ is used for the transmission layer 106, the top and bottom semiconductor layers 102 and 104 can be composed of Si, or when $Al_2O_3$ is used for transmission layer 106, the top and bottom semiconductor layers 102 and 104 can be composed of GaAs.

The top semiconductor layer 102 and the bottom semiconductor layers 104 can each be doped with electron donor or electron acceptor impurities in order to form a p-type semiconductor layer and an opposing n-type semiconductor layer. For example, in certain embodiments of the present invention, the top semiconductor layer 102 can be doped with an electron acceptor dopant in order to form a p-type semiconductor layer, and the bottom semiconductor layer 104 can be doped with an electron donor dopant in order to form an n-type semiconductor layer. In other embodiments of the present invention, the top semiconductor layer 102 can be an n-type semiconductor layer, while the bottom semiconductor layer 104 can be a p-type semiconductor layer.

Although the holes shown in FIGS. 1-3 are rectangular, in other embodiments of the present invention, the holes can be square, circular, elliptical, or any other suitable shape for forming a Bragg grating within the slot waveguide 112. The slot waveguide 112 is formed by sandwiching the transmission layer 106 with a nanometer thickness between the top and bottom semiconductor layers 102 and 104. The materials selected for the top and bottom semiconductor layers 102 and 104 also have a relatively higher refractive index than the transmission layer 106. As a result, the slot waveguide 112 configuration enables the concentration of a large fraction of a guided mode into the relatively thin, nanometer thick, low-index transmission layer 112 sandwiched between two relatively thicker, higher refractive index top and bottom semiconductor layers 102 and 104. In other words, this slot waveguide 112 configuration enhances and substantially concentrates ER to the transmission layer 106. A smaller fraction of the ER reaches the relatively lossy top and bottom semiconductor layers 102 and 104. In certain embodiments of the present invention, for example, the transmission layer 106 can be configured with a dielectric material having a refractive index of approximately 1.5, while the top and bottom semiconductor layers 102 and 104 can be configured with semiconductor materials having a higher refractive index of approximately 3.5. For a more detailed and general description of slot waveguides, see "Guiding and confining light in void nanostructures," V. R. Almeida et al., *Optics Letters*, Vol. 29, No. 11, June (2004).

Figure 4:
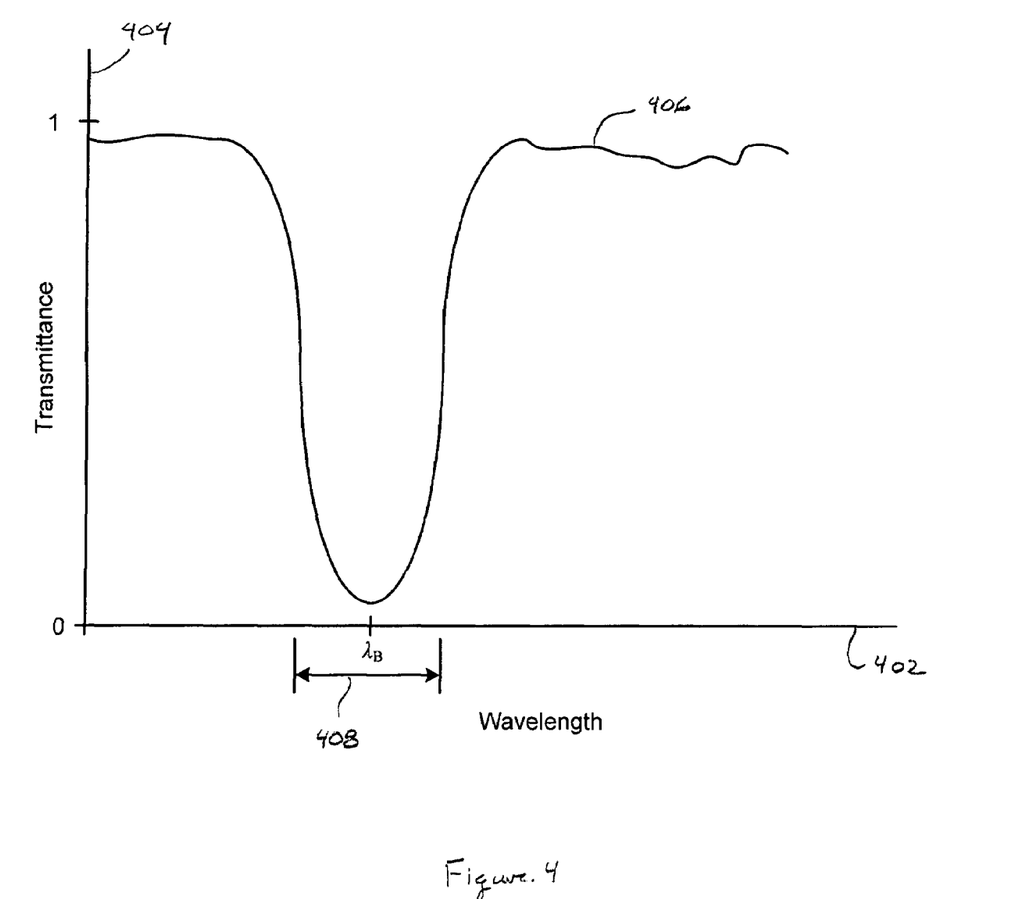
FIG. 4 shows a plot of an exemplary transmittance curve associated with a slot waveguide of the first modulator in accordance with embodiments of the present invention.

The size, shape, and lattice period Λ are parameters associated with the holes forming the Bragg grating in the slot waveguide 112, which can be selected to reflect ER with certain wavelengths and transmit ER with other wavelengths. In other words, the Bragg grating can be used as an inline filter that substantially blocks ER over a range of wavelengths centered about a certain wavelength also referred to as a Bragg wavelength $\lambda_B$. FIG. 4 shows an exemplary plot of a transmittance curve associated with the hypothetical slot waveguide 112, shown in FIGS. 1-2, in accordance with embodiments of the present invention. A horizontal axis 402 represents a range of wavelengths associated with ER transmitted into the waveguide 112, a vertical axis 404 represents transmittance, and a transmittance curve 406 displays the transmittance. The transmittance can be mathematically represented by:

$$\text{Transmittance} = \frac{I_{out}}{I_{in}}$$

where $I_{in}$ represents the intensity of the ER input to the waveguide 112, and $I_{out}$ represents the intensity of the ER output from the waveguide 112.

As shown in FIG. 4, ER with wavelengths in a neighborhood 408 of the Bragg wavelength $\lambda_B$ is substantially reflected. In other words, the output intensity $I_{out}$ associated with ER having wavelengths within the neighborhood 408 is nearly "0." In contrast, ER with wavelengths outside of the neighborhood 408 is substantially transmitted through the waveguide 112. In other words, the output intensity $I_{out}$ associated with ER having wavelengths outside the neighborhood 408 is nearly equal to the input intensity $I_{in}$.

Figure 5:
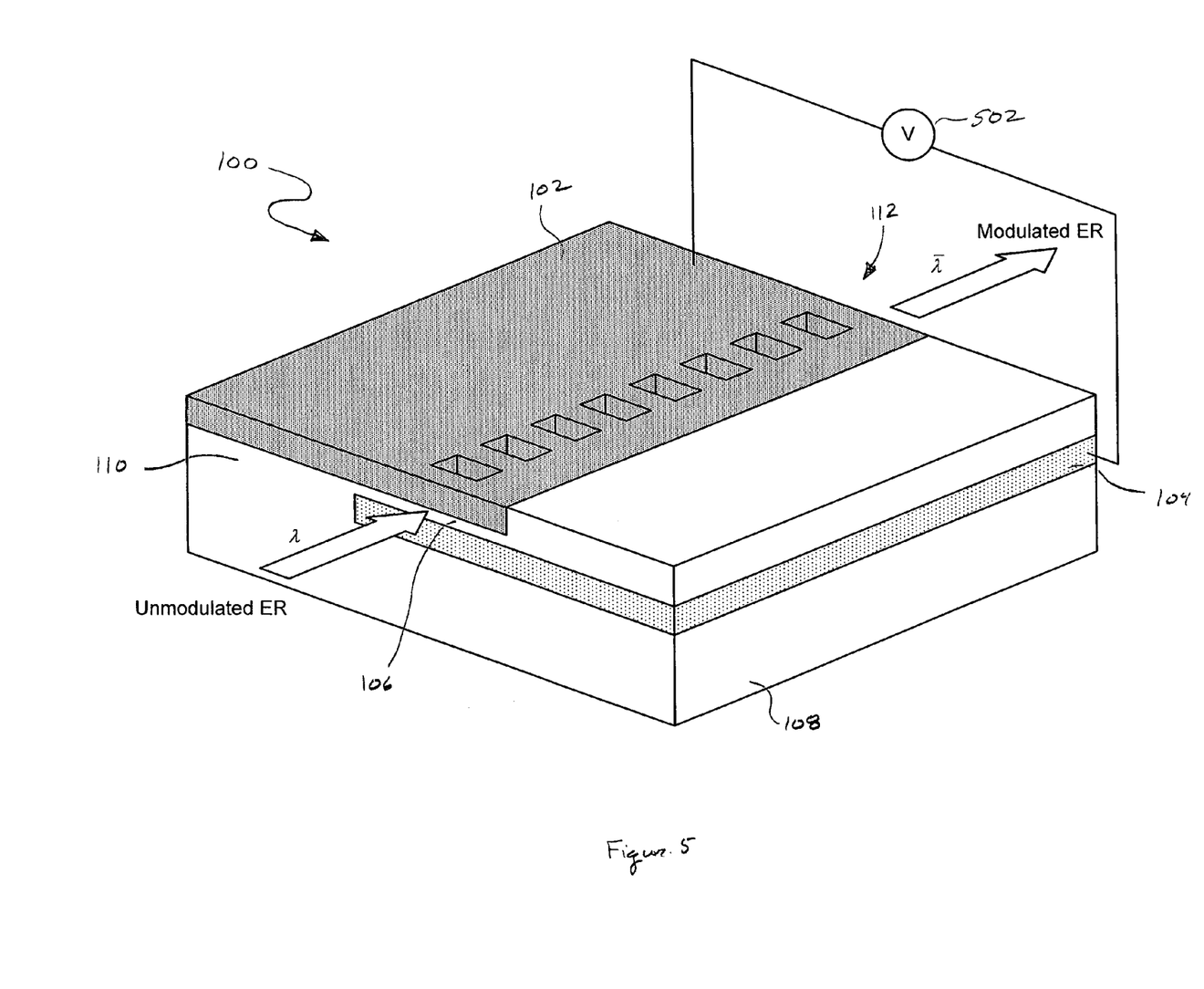
FIG. 5 shows a schematic representation of a slot waveguide of the first modulator receiving unmodulated electromagnetic radiation and outputting modulated electromagnetic radiation in accordance with embodiments of the present invention.

In order to use the modulator 100 as a device for encoding information in ER transmitted along the slot waveguide 112, the top and bottom semiconductor layers 102 and 104 are placed in electrical communication with a voltage source 502, as schematically represented in FIG. 5 in accordance with embodiments of the present invention. The voltage source 502 can be in electrical communication with a processor, memory, or any other computational device that is capable of generating, storing, and processing information. Applying an appropriate voltage across the slot waveguide 112 reduces the refractive index of the top and bottom semiconductor layers 102 and 104, but does not significantly reduce the refractive index of the transmission layer 106, where the layer 102 can be n-type, the layer 104 can be p-type, and the layer 106 can be an intrinsic semiconductor forming a p-i-n structure. By reverse biasing the n-i-p structure, we can deplete the carriers in the n and p layers to change its index of refraction. By electronically changing the refractive index of the top and bottom semiconductor layers 102 and 104, the intensity of the ER input to the slot waveguide 112 can be correspondingly modulated, which, in turn, can be used to encoded information in the ER. As shown in FIG. 5, unmodulated ER with a substantially constant intensity is input to the slot waveguide 112. Information generated by a computational device (not shown) is encoded in a pattern of high and low voltages that is applied to the slot waveguide 112. This pattern of voltages correspondingly shifts the refractive index of the slot waveguide 112 producing modulated ER encoding the same information.

Figure 6A:
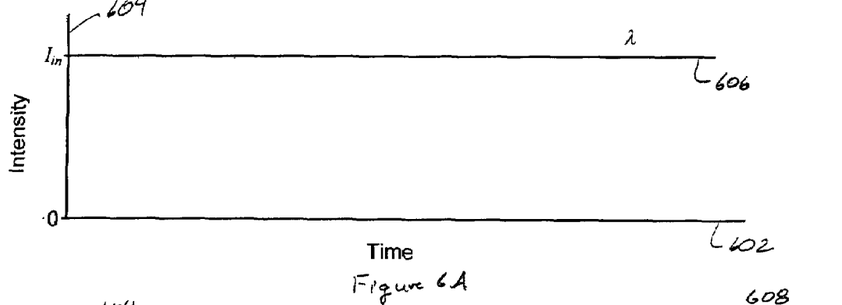
FIG. 6A shows a plot of intensity versus time associated with hypothetical unmodulated electromagnetic radiation input to a slot waveguide of the first modulator in accordance with embodiments of the present invention.
Figure 6B:
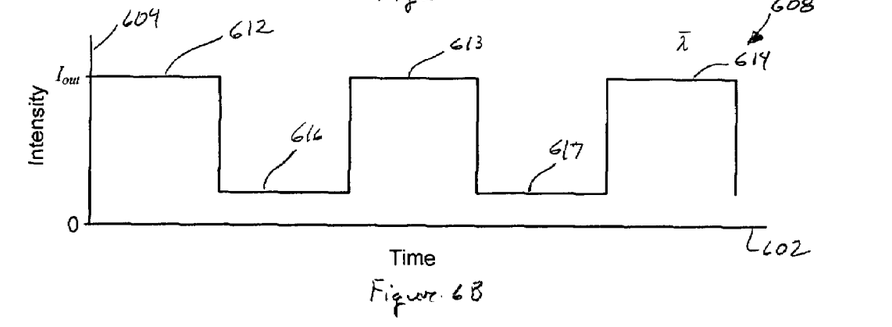
FIG. 6B shows a plot of intensity versus time associated with modulated electromagnetic radiation output from a slot waveguide of the first modulator in accordance with embodiments of the present invention.

FIG. 6A shows a plot of intensity versus time associated with unmodulated ER input to the slot waveguide 112 in accordance with embodiments of the present invention. As shown in FIG. 6A, a horizontal axis 602 represents time, a vertical axis 604 represents intensity, and a flat horizontal curve 606 represents the substantially constant intensity $I_{in}$ associated with unmodulated ER input to the slot waveguide 112. FIG. 6B shows a plot of intensity versus time associated with modulated ER output from the slot waveguide 112 in accordance with embodiments of the present invention. Curve 608 represents modulate ER output from the waveguide 112 that has been generated by applying a pattern of voltages representing the binary number "10101." The high and low output intensity $I_{out}$ levels of the modulated ER output from the waveguide 112 are associated with binary numbers comprising the same binary number "10101." For example, the curve 608 represents the binary number "10101" by assigning the binary number "1" to correspond to the relatively higher intensity portions 612-614 of the curve 608 and by assigning the binary number "0" to correspond to the relatively lower intensity portions 616 and 617 of the curve 608.

Figure 7:
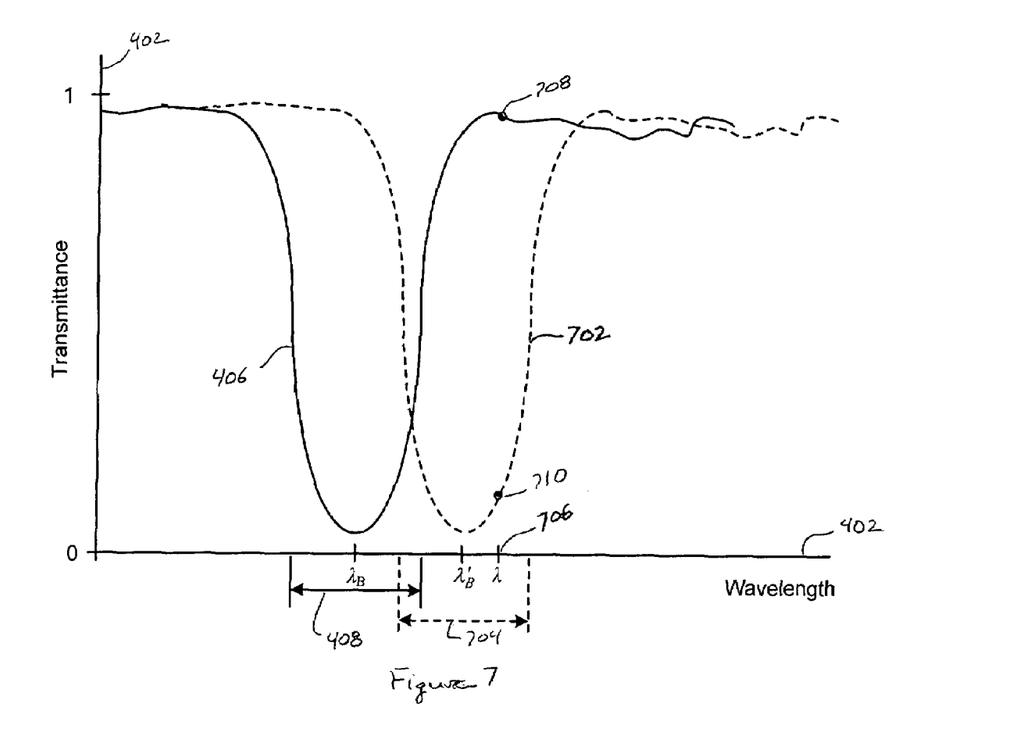
FIG. 7 shows a plot of two exemplary transmittance curves associated with a slot waveguide of the first modulator in accordance with embodiments of the present invention.

Generating the high and low intensity levels of the curve 608 can be accomplished as follows. FIG. 7 shows a plot of two exemplary transmittance curves associated with the slot waveguide 112 in accordance with embodiments of the present invention. The transmittance curve 406 is described above with reference to FIG. 4, and a dashed-line transmittance curve 702 represents transmittance of ER over a wide range of wavelengths transmitted through the slot waveguide 112 when an appropriate voltage is applied to the slot waveguide 112. As shown in FIG. 7, when the appropriate voltage is applied to the slot waveguide 112, the refractive index of the top and bottom semiconductor layers 102 and 104 decreases causing the Bragg wavelength $\lambda_B$ to shift to a Bragg wavelength $\lambda'_B$ and the neighborhood 408 to correspondingly shift to a neighborhood 704. In certain embodiments of the present invention, for example, the unmodulated ER input to the slot waveguide 112 can be selected with a wavelength $\lambda$ 706 that lies outside the neighborhood 408 which corresponds to a relatively high-transmittance level of nearly "1" represented by a point 708 on the transmittance curve 406. When the appropriate voltage is applied to the slot waveguide 112, ER with wavelength $\lambda$ 704 lies within the neighborhood 704 and corresponds to a low-transmittance level of nearly "0" represented by a point 710. In other words, when no voltage is applied to the slot waveguide 112, ER output from the slot waveguide 112 has an output intensity $I_{out}$ corresponding to the relatively higher intensity portions 612-614, and when an appropriate voltage is applied to the slot waveguide 112, ER output from the slot waveguide 112 has an output intensity $I_{out}$ corresponding to the relatively lower intensity portions 616 and 617.

In other embodiments of the present invention, initially unmodulated ER can be selected with a wavelength that lies inside the neighborhood 408 and when the appropriate voltage is applied to the slot waveguide 112, the ER lies outside the neighborhood 704. In other words, when the appropriate voltage is applied to the slot waveguide 112, modulated ER output from the slot waveguide 112 has an output intensity $I_{out}$ corresponding to the relatively high intensity portions 612-614, and when no voltage is applied to the slot waveguide 112, the ER output from the slot waveguide 112 has an output intensity $I_{out}$ corresponding to the relatively lower intensity portions 616 and 617.

Figure 8A:
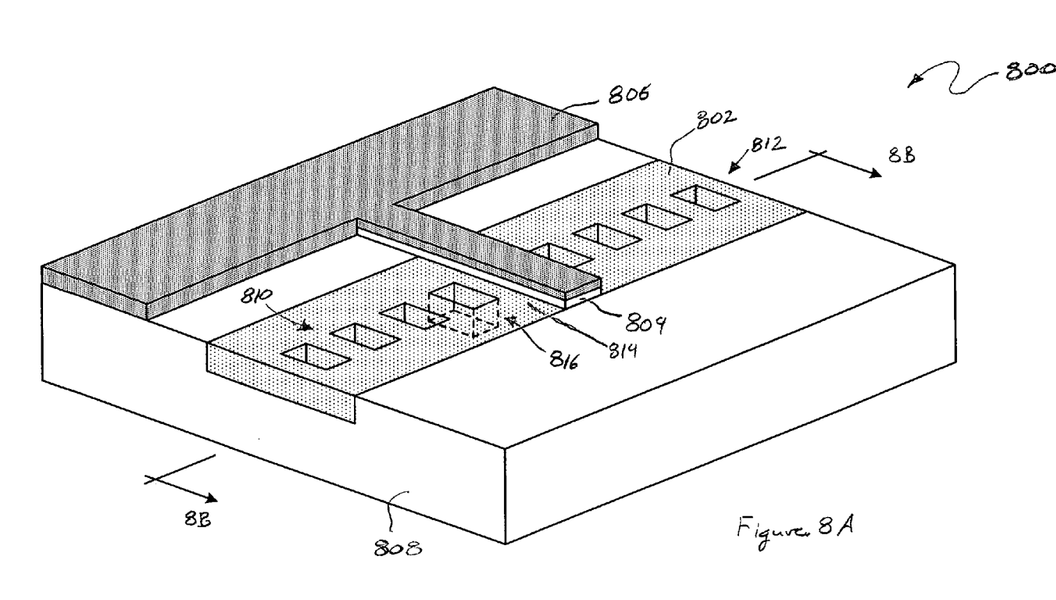
FIG. 8A shows an isometric view of a second modulator in accordance with embodiments of the present invention.
Figure 8B:
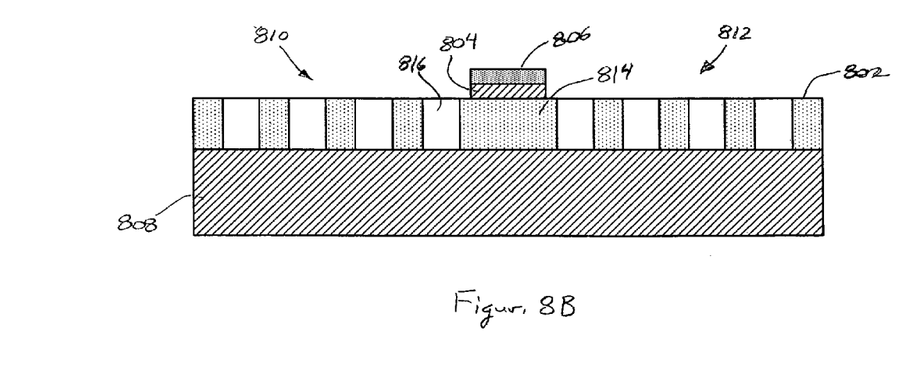
FIG. 8B shows a cross-sectional view of the second modulator in accordance with embodiments of the present invention.

FIG. 8A shows an isometric view of a second modulator 800 in accordance with embodiments of the present invention. The modulator 800 includes a semiconductor waveguide 802, an insulating spacer 804, an electrode 806, and a substrate 808. The waveguide 802 is partially embedded in the substrate 808 and includes a first row of holes 810 that is separated from a second row of holes 812 in order to form a resonant cavity 814 that is located beneath the insulating spacer 804. The holes in the first and second row of holes 810 and 812 extend through the waveguide 802 to the substrate 808, as indicated by a hole 816 in the first row of holes 810. FIG. 8B shows a cross-sectional view of the modulator 800 in accordance with embodiments of the present invention. As shown in FIG. 8B, the resonant cavity 814 is a region of the waveguide 802 that separates the first and second rows of holes 810 and 812 and is located beneath the insulating layer 804, a portion of which is also covered by the electrode 806.

The waveguide 802 and the electrode 806 can be composed of a type IV semiconductor, a type III-V semiconductor, or a type II-VI semiconductor, as described above with reference to the first modulator 100. The waveguide 802 and the electrode 804 can each be doped with either electron donor or electron acceptor impurities in order to form p-type and n-type semiconductors. For example, in certain embodiments of the present invention, the waveguide 802 can be composed of a p-type semiconductor, and the electrode 806 can be composed of an n-type semiconductor. In other embodiments of the present invention, the waveguide 802 can be composed of an n-type semiconductor, and the electrode 806 can be composed of a p-type semiconductor. The insulating spacer 804 and the substrate 808 can be composed of $SiO_2$, $Al_2O_3$, $Si_3N_4$, a dielectric polymer, or any other suitable dielectric material having a relatively lower refractive index than, and substantially lattice matches, the waveguide 802 and the electrode 806. For example, when $SiO_2$ is used for the insulating spacer 804 and the substrate 808, the waveguide 802 and the electrode 806 can be composed of Si, or when $Al_2O_3$ is used for the insulating spacer 804 and the substrate 808, the waveguide 802 and the electrode 806 can be composed of GaAs.

Figure 9:
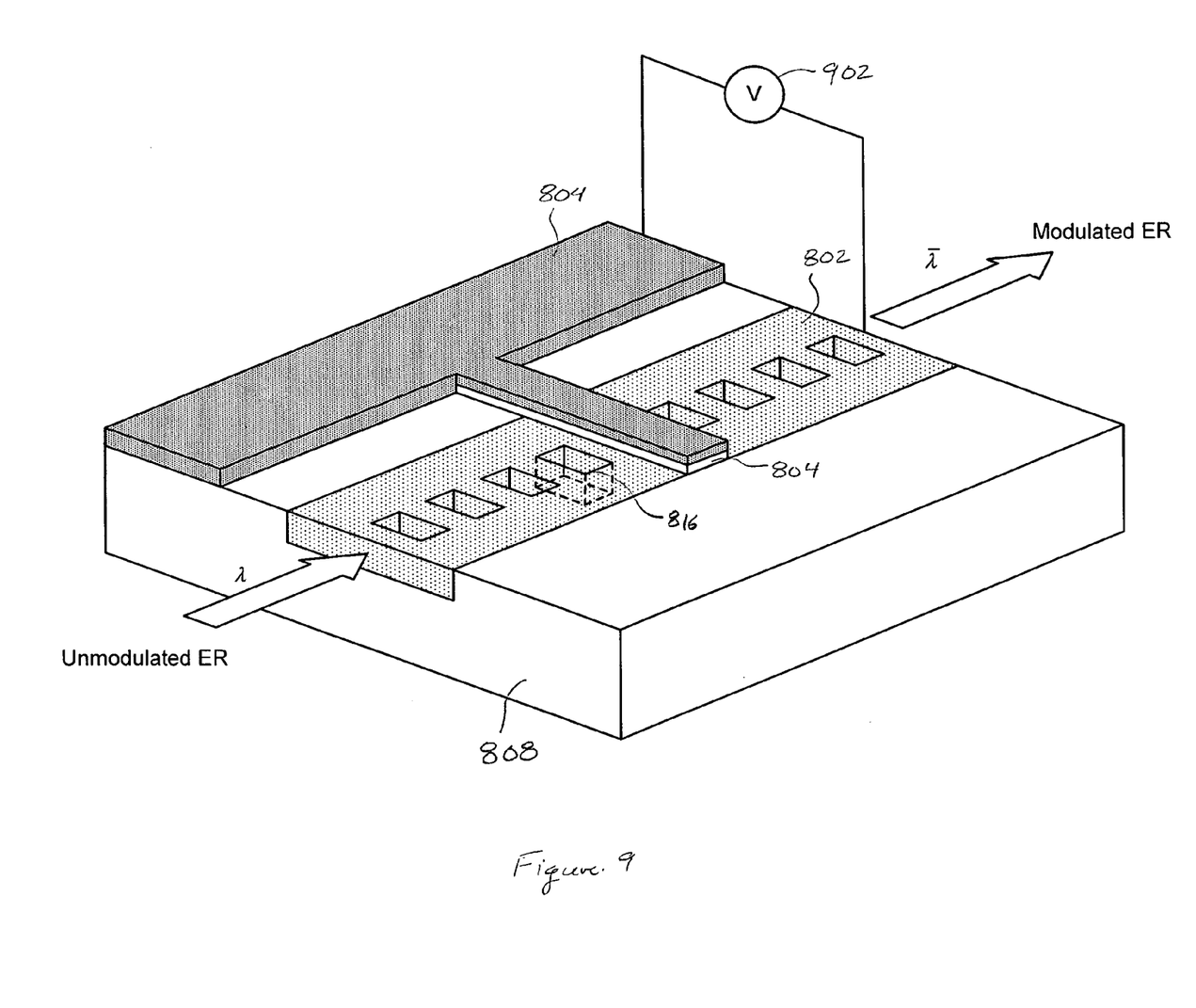
FIG. 9 shows a schematic representation of a waveguide of the second modulator receiving unmodulated electromagnetic radiation and outputting modulated electromagnetic radiation in accordance with embodiments of the present invention.

Although the holes shown in FIG. 8 are rectangular, in other embodiments of the present invention, the holes can be square, circular, elliptical, or any other suitable shape. The first and second row of holes 810 and 812 are Bragg gratings whose separation forms the resonant cavity 814. ER of a selected wavelength that is resonant with the resonant cavity 814 can be input to the waveguide 802. The ER bounces back and forth within the resonant cavity 814 with low loss. As more ER wave energy enters the resonant cavity 814, it combines with and reinforces a standing wave of ER within the resonant cavity, which, in turn, increases the intensity of the ER trapped within the resonant cavity 814. ER having a relative larger intensity than the input ER can then be output from the waveguide 802. The size, shape, and lattice period of the Bragg gratings can be selected to operate as described above with reference to FIG. 4 in order to reflect ER with certain wavelengths and transmit ER with other wavelengths. The waveguide 802 has a relatively larger refractive index than the substrate 808 and the insulating spacer 804. As a result, ER transmitted in the waveguide 802 is guiding by total internal reflection. In order to use the modulator 800 for encoding information in ER transmitted along the waveguide 802, the waveguide 802 and electrode 806 are placed in electrical communication with a voltage source 902, as schematically represented in FIG. 9 in accordance with embodiments of the present invention. The voltage source 902 can be in electrical communication with a processor, memory, or any other computational device that is capable of generating, storing, or processing information. As shown in FIG. 9, unmodulated ER with a substantially constant intensity is input to the waveguide 802, and modulated ER encoding information in the intensity of the ER is output from the waveguide 802, as described above with reference to FIG. 6.

Figure 10:
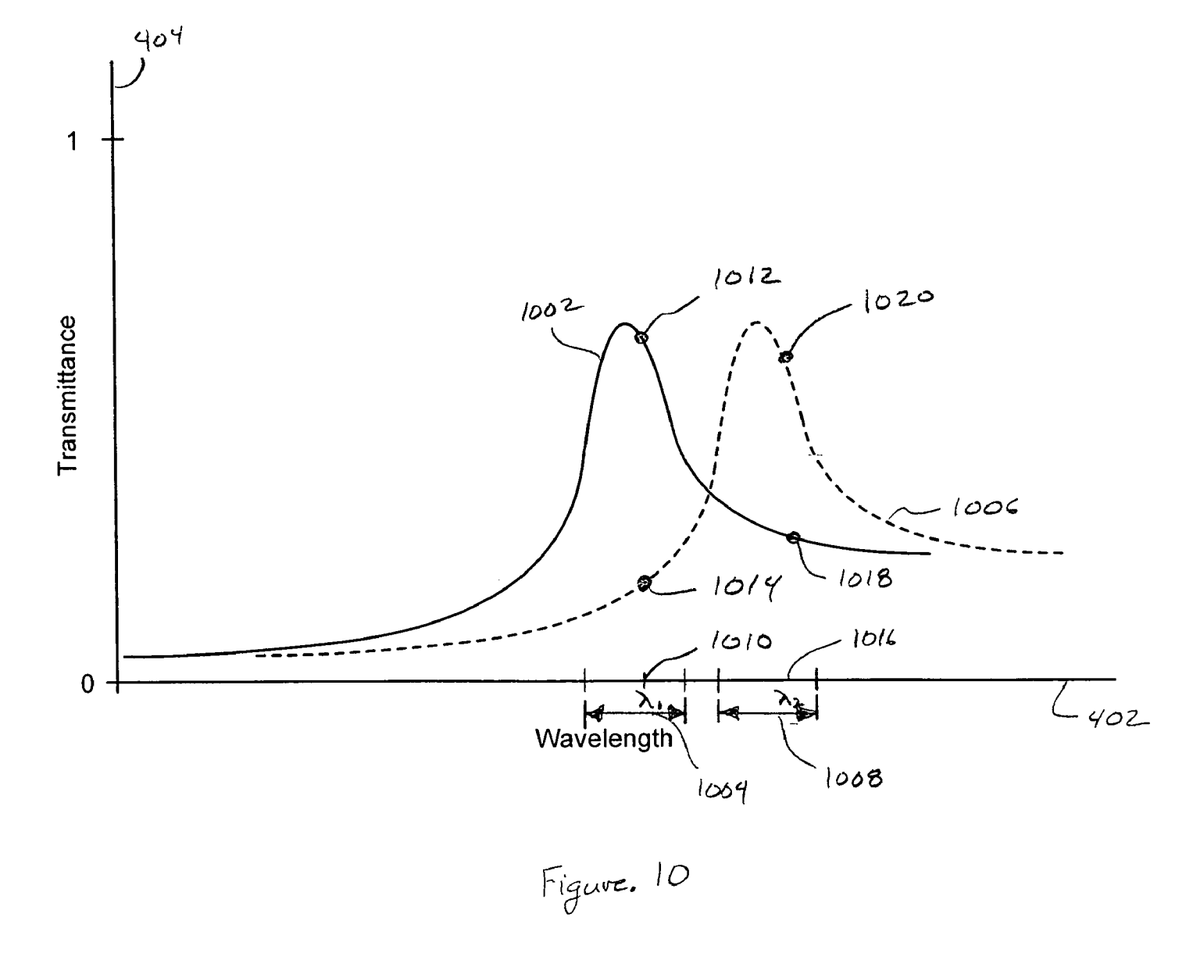
FIG. 10 shows a plot of two exemplary transmittance curves associated with a waveguide of the second modulator in accordance with embodiments of the present invention.

The intensity of the ER output from the waveguide 802 can be modulated by applying an appropriate voltage across the waveguide 802 so that the refractive index of the waveguide 802 is changed. FIG. 10 shows an exemplary plot of two transmittance curves associated with the waveguide 802. A transmittance curve 1002 represents transmittance of ER through the waveguide 802 when no voltage is applied to the waveguide 802. ER with wavelengths in a neighborhood 1004 is essentially transmitted through the waveguide 102, and ER with wavelengths outside of the neighborhood 1004 is essentially reflected. FIG. 10 also includes a transmittance curve 1006 that represents transmittance of ER through the waveguide 802 when an appropriate voltage is applied to the waveguide 802. The transmittance curve 1002 shows that while the appropriate voltage is applied, ER with wavelengths in a neighborhood 1008 is essentially transmitted through the waveguide 102, and ER with wavelengths outside of the neighborhood 1008 is essentially reflected. In other words, applying the appropriate voltage to the waveguide 802 changes the refractive index of the waveguide 802 so that ER over a different range of wavelengths can be transmitted through the waveguide 802.

The modulator 800 can be used to encode information in unmodulated ER as follows. In certain embodiments of the present invention, for example, the unmodulated ER input to the waveguide 802 can be selected with a wavelengths $\lambda_1$ 1010 that lies within the neighborhood 1004, which corresponds to a relatively high-transmittance level represented by a point 1012 on the transmittance curve 1004 and the relatively higher output intensities $I_{out}$ 612-614 shown in FIG. 6B. However, when the appropriate voltage is applied to the waveguide 802, the ER with wavelengths $\lambda_1$ 1010 corresponds to a relatively lower transmittance level represented by a point 1014 on the transmittance curve 1006 and the relatively lower output intensities $I_{out}$ 616 and 617 shown in FIG. 6B. In other embodiments of the present invention, the unmodulated ER input to the waveguide 802 can be selected with wavelengths $\lambda_2$ 1016 that lies within the neighborhood 1008, which corresponds to a relatively low transmittance level represented by a point 1018 on the transmittance curve 1002 and the relatively lower output intensities $I_{out}$ 616 and 617, shown in FIG. 6B. When the appropriate voltage is applied to the waveguide 802, the ER with wavelengths $\lambda_2$ 1016 lying in the neighborhood 1008 corresponds to a relatively higher transmittance level represented by a point 1020 on the transmittance curve 1006 and the relatively higher output intensities $I_{out}$ 612-614, shown in FIG. 6B.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A modulator comprising:
   a slot waveguide having
      a top semiconductor layer,
      a bottom semiconductor layer, and
      a transmission layer sandwiched between the top semiconductor layer and the bottom semiconductor layer, wherein the slot waveguide includes a plurality of holes forming a Bragg grating along the length of the slot waveguide; and a substrate layer, wherein the bottom semiconductor layer covers at least a portion of the substrate, and the top semiconductor layer covers at least a portion of the substrate and the transmission layer.

2. The modulator of claim 1 wherein the top semiconductor layer and the bottom semiconductor layer further comprises a p-type top semiconductor layer and an n-type bottom semiconductor layer.

3. The modulator of claim 1 wherein the top semiconductor layer and the bottom semiconductor layer further comprises an n-type top semiconductor layer and a p-type bottom semiconductor layer.

4. The modulator of claim 1 wherein the transmission layer has a relatively smaller thickness than the top semiconductor layer and the bottom semiconductor layer forming a slot waveguide.

5. The modulator of claim 1 wherein the holes in the row of holes further comprise one of:
rectangular shape;
square shape;
circular shape;
elliptical shape; and
any suitable shape.

6. The modulator of claim 1 wherein the top semiconductor layer and the bottom semiconductor layer further comprises materials having a relatively higher refractive index than the transmission layer.

7. The modulator of claim 1 wherein the transmission layer further comprises one of:
$SiO_2$;
$Al_2O_3$;
$Si_3N_4$;
a dielectric polymer;
a semiconductor;
a semiconductor alloy;
a porous semiconductor;
an intrinsic semiconductor; and
any other dielectric material suitable for transmitting electromagnetic radiation.

8. The modulator of claim 1 wherein the top semiconductor layer and the bottom semiconductor layer further comprise one of:
group IV semiconductor;
a III-V semiconductor; and
a II-VI semiconductor.

9. The modulator of claim 1 further comprising a voltage source in electrical communication with the top semiconductor layer and the bottom semiconductor layer so that applying a voltage to the top semiconductor layer and the bottom semiconductor layer reduces the refractive indexes of the top semiconductor layer and the bottom semiconductor layer.

10. The modulator of claim 1 wherein each hole in the plurality of holes extends through the top semiconductor layer, the transmission layer, and the bottom semiconductor layer.

11. The modulator of claim 1 wherein the holes in the plurality of holes are approximately regularly spaced and are aligned along the length of the slot waveguide.

12. A modulator comprising:
a waveguide having a plurality of holes, wherein the holes are approximately regularly spaced along the length of the waveguide and arranged to form a resonant cavity having a top surface and a bottom surface;
an insulating spacer configured to cover only a portion of the top surface of the resonant cavity;
an electrode configured to cover only a portion of the insulating spacer; and
a voltage source in electrical communication with the waveguide and the electrode so that applying a voltage to the waveguide and the electrode changes the refractive index of the waveguide.

13. The modulator of claim 12 wherein the waveguide further comprises a p-type semiconductor and the electrode further comprises an n-type second semiconductor.

14. The modulator of claim 12 wherein the waveguide further comprises an n-type semiconductor and the electrode further comprises a p-type second semiconductor.

15. The modulator of claim 12 wherein the holes in the waveguide further comprise one of:
rectangular shape;
square shape;
circular shape;
elliptical shape; and
any suitable shape.

16. The modulator of claim 12 further comprises a substrate layer supporting the waveguide and at least a portion of the electrode and having a lower refractive index than the waveguide.

17. The modulator of claim 12 wherein the insulating spacer further comprises one of:
$SiO_2$;
$Al_2O_3$;
$Si_3N_4$;
a dielectric polymer; and
any dielectric material.

18. The modulator of claim 12 wherein the waveguide and the electrode further comprise one of:
group IV semiconductor;
a III-V semiconductor; and
a II-VI semiconductor.

* * * * *

UNITED STATES PATENT AND TRADEMARK OFFICE
CERTIFICATE OF CORRECTION

PATENT NO.      : 7,546,017 B2
APPLICATION NO. : 11/904887
DATED           : June 9, 2009
INVENTOR(S)     : Mihail Sigalas et al.

Page 1 of 1

It is certified that error appears in the above-identified patent and that said Letters Patent is hereby corrected as shown below:

On the title page, in item (75), in "Inventors", in column 1, line 1,
delete "Mihail Siga" and insert -- Mihail Sigalas --, therefor.

In column 4, line 3, delete "$In_xGa_{1-x}Asy_yP_{1-y}$" and insert -- $In_xGa_{1-x}As_yP_{1-y}$ --, therefor.

Signed and Sealed this

Thirtieth Day of March, 2010

David J. Kappos
*Director of the United States Patent and Trademark Office*